(12) United States Patent
Shimada et al.

(10) Patent No.: US 12,460,137 B2
(45) Date of Patent: Nov. 4, 2025

(54) CHARCOAL MAKING APPARATUS

(71) Applicant: MONJYU CO., LTD., Osaka (JP)

(72) Inventors: Hayami Shimada, Osaka (JP); Eiko Kodaka, Yamanashi (JP)

(73) Assignee: MONJYU CO., LTD., Osaka (JP)

( * ) Notice: Subject to any disclaimer, the term of this patent is extended or adjusted under 35 U.S.C. 154(b) by 0 days.

(21) Appl. No.: 18/572,690

(22) PCT Filed: Sep. 3, 2021

(86) PCT No.: PCT/JP2021/032518
§ 371 (c)(1),
(2) Date: Dec. 20, 2023

(87) PCT Pub. No.: WO2023/032174
PCT Pub. Date: Mar. 9, 2023

(65) Prior Publication Data
US 2024/0368473 A1  Nov. 7, 2024

(51) Int. Cl.
*C10B 53/02* (2006.01)
*C10B 49/02* (2006.01)

(52) U.S. Cl.
CPC .............. *C10B 53/02* (2013.01); *C10B 49/02* (2013.01)

(58) Field of Classification Search
CPC .......... C10B 53/02; C10B 49/02; Y02E 50/10
See application file for complete search history.

(56) References Cited

U.S. PATENT DOCUMENTS

| | | | |
|---|---|---|---|
| 2004/0213726 A1* | 10/2004 | Broembsen | C01B 32/366 201/19 |
| 2014/0110241 A1* | 4/2014 | Deev | C10B 1/04 201/40 |
| 2016/0053182 A1* | 2/2016 | Ericsson | C10B 41/08 201/20 |

(Continued)

FOREIGN PATENT DOCUMENTS

| JP | 3-15537 Y | 4/1991 |
|---|---|---|
| JP | 4-2118427 U | 10/1992 |

(Continued)

OTHER PUBLICATIONS

The 1st Office Action issued for the corresponding Japanese Patent application No. JP2022-525371.

*Primary Examiner* — Ellen M Mcavoy
(74) *Attorney, Agent, or Firm* — IP Business Solutions, LLC.

(57) ABSTRACT

A charcoal making apparatus including a charcoal making furnace, a flue gas device, and a passage connecting the charcoal making furnace and the flue gas device to each other. The charcoal making furnace includes a base and a charcoal making unit mounted on the base. The charcoal making unit includes a first portion that houses a charcoal making target and is open at an upper surface, a second portion located above the base and below the first portion, and a lid covering at least the upper surface of the first portion. A boundary between the first portion and the second portion is at least partially made of a mesh. The charcoal making unit includes at least two openings each allowing inside and outside of the charcoal making unit to communicate with each other, and at least one of the openings communicates with the passage.

10 Claims, 12 Drawing Sheets

(56) References Cited

U.S. PATENT DOCUMENTS

2018/0237697 A1* 8/2018 Caregnato ............... C10B 49/02
2020/0385273 A1* 12/2020 Dunnigan ................. F27B 7/14

FOREIGN PATENT DOCUMENTS

| JP | 7-258653 A | 10/1995 |
| JP | 2001-354971 A | 12/2001 |
| JP | 3390757 B | 3/2003 |
| JP | 2005-127689 A | 5/2005 |
| JP | 2006-016608 A | 1/2006 |
| JP | 2018-021173 A | 2/2018 |

* cited by examiner (a)

(b)

(a)

(b)

CHARCOAL MAKING APPARATUS

TECHNICAL FIELD

The present invention relates to a charcoal making apparatus.

BACKGROUND ART

A known charcoal making kiln includes an outer shell and a basket placed in the outer shell. Patent Literature 1, for example, discloses a charcoal making kiln including a tapered tunnel-like outer shell and a basket made of a perforated iron plate. In the charcoal making kiln of Patent Literature 1, the inside of the basket is divided into a plurality of sections so that a plurality of types of charcoals can be produced at a time with one kiln.

A known charcoal making apparatus includes a charcoal making kiln and a secondary combustion device. Patent Literature 2, for example, discloses a charcoal making apparatus including a charcoal making kiln having a double structure of an inner kiln and an outer kiln and a secondary combustion chamber connected to the charcoal making kiln. In the charcoal making apparatus of the Patent Literature 2, the secondary combustion chamber is provided in an upper portion of the outer kiln, and Patent Literature 2 shows that flue gas from the charcoal making kiln may be burnt with a burner or may be directly heated with heat of the charcoal making kiln.

CITATION LIST

Patent Literatures

Patent Literature 1: Japanese Patent No. 3390757
Patent Literature 2: Japanese Patent Application Laid-Open No. 2001-354971

SUMMARY OF INVENTION

Technical Problem

To utilize biomass generated in various places, charcoal making apparatus with fewer locational restrictions has been demanded. Charcoal making apparatus capable of efficiently carbonizing various raw materials has also been demanded.

It is therefore an object of the present invention to provide a charcoal making apparatus having fewer locational restrictions and capable of carbonizing various raw materials.

Solution to Problems

A charcoal making apparatus according to the present disclosure includes a charcoal making furnace, a flue gas device, and a passage connecting the charcoal making furnace and the flue gas device to each other. The charcoal making furnace includes a base and a charcoal making unit mounted on the base. The charcoal making unit includes a first portion that houses a charcoal making target and is open at an upper surface, a second portion located above the base and below the first portion, and a lid covering at least the upper surface of the first portion. A boundary between the first portion and the second portion is at least partially made of a mesh. The charcoal making unit includes at least two openings each allowing inside and outside of the charcoal making unit to communicate with each other. At least one of the openings communicates with the passage.

Effects of the Invention

The charcoal making apparatus described above has fewer locational limitations and is capable of carbonizing various raw materials.

DESCRIPTION OF EMBODIMENTS

Summary of Embodiment

Figure 1:
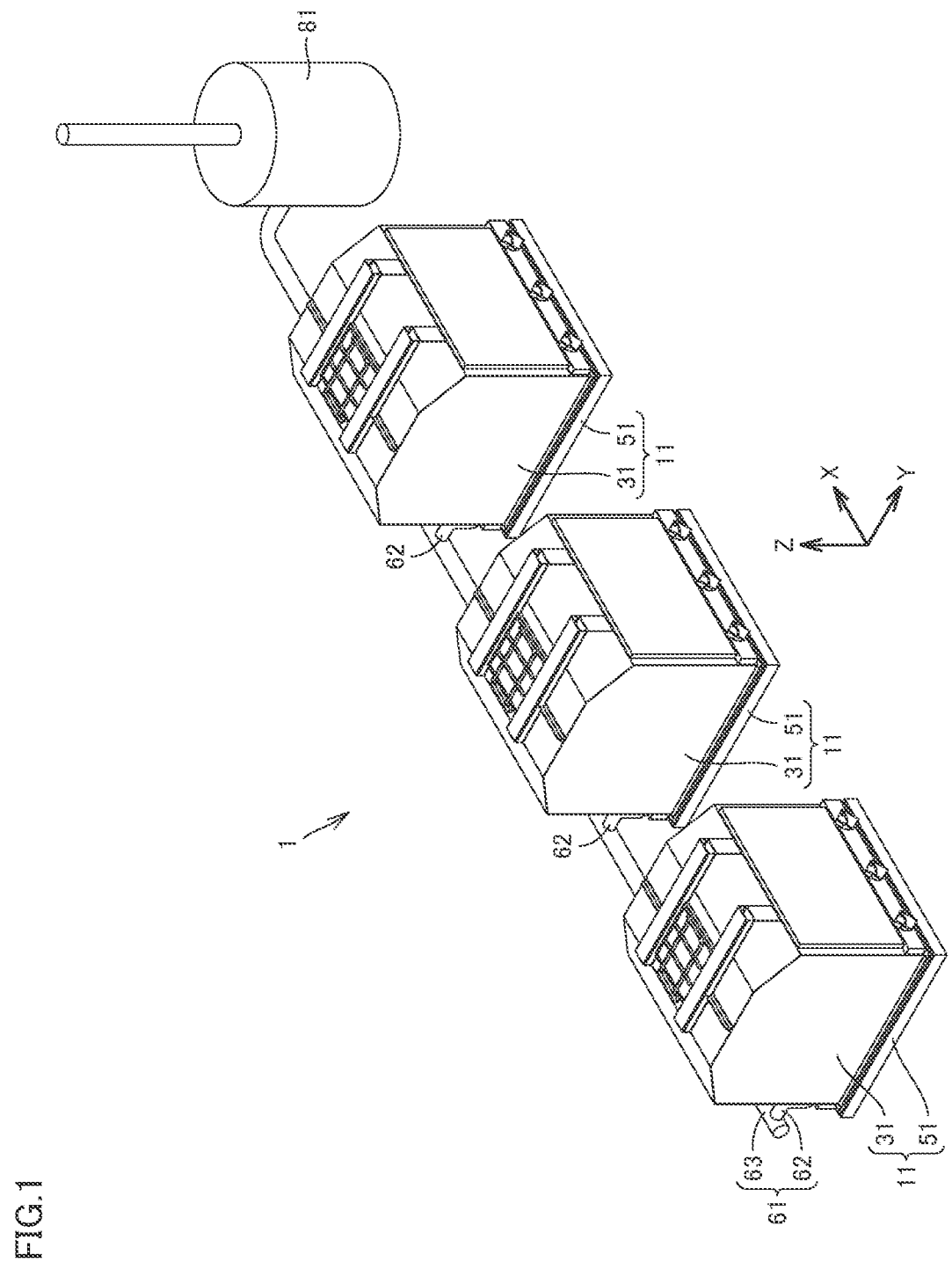
FIG. 1 is a perspective view illustrating an example of a charcoal making apparatus according to the present disclosure.

First, an embodiment of the present disclosure will be described by listing. A charcoal making apparatus according to the present disclosure includes a charcoal making furnace, a flue gas device, and a passage connecting the charcoal making furnace and the flue gas device to each other. The charcoal making furnace includes a base and a charcoal making unit mounted on the base. The charcoal making unit includes a first portion that houses a charcoal making target and is open at an upper surface, a second portion located above the base and below the first portion, and a lid covering at least the upper surface of the first portion. A boundary between the first portion and the second portion is at least partially made of a mesh. The charcoal making unit includes at least two openings each allowing inside and outside of the charcoal making unit to communicate with each other. At least one of the openings communicates with the passage.

A known charcoal making kiln includes an outer shell and a basket placed in the outer shell (see, for example, Patent Literature 1). In the charcoal making kiln of Patent Literature 1, the basket can be put in and out through a door at the front surface of the outer shell. The basket is partitioned into a plurality of sections. This configuration eases loading and unloading of charcoal raw materials and enables different raw materials to be put in the respective sections for charcoal making. On the other hand, in the charcoal making kiln of Patent Literature 1, a plurality of materials are housed in one basket, and thus, it is impossible to taken out only a specific material during progress of a charcoal making process. In addition, in this charcoal making kiln, a kindling material is supplied to the frontmost section of the sections of the basket.

On the other hand, in the charcoal making apparatus according to the present disclosure, the charcoal making furnace includes the base and the charcoal making unit mounted on the base, and the charcoal making unit includes the first portion that houses a charcoal making target, the second portion located below the first portion, and the lid covering the upper surface of the first portion. In an initial stage of charcoal making, a kindling material is supplied to the second portion so that the kindling material is burnt. The boundary between the first portion and the second portion is at least partially made of a mesh. Accordingly, heat generated by combustion of the kindling material is transferred from the entire lower surface of the first portion to the charcoal making target supplied to the first portion. This configuration enables uniform and rapid carbonization of the charcoal making target In a conventional charcoal making furnace of a type in which carbonization progresses in a hermetic furnace (hereinafter also referred to as a "hermetic furnace"), a kindling material is often placed in front of a charcoal making material housed in the furnace. In a case where the kindling material is placed only at the front in the furnace, however, heat tends to be nonuniformly circulated in the furnace. Thus, a high-level technique is required for controlling placement and combustion of materials in the furnace. On the other hand, in another type of a known charcoal making furnace, carbonization progresses in a furnace that is open at the top (hereinafter also referred to as an "open furnace"). Typically, in the open furnace, a charcoal making material is placed on the bottom surface of the furnace and ignited, and then, layers of the charcoal making material are sequentially stacked to thereby create a steamed state, and a charcoal making process is performed. It is, however, difficult in the open furnace to maintain high temperatures as compared to the hermetic furnace, and the time for making charcoal tends to be long.

In the charcoal making apparatus according to the present disclosure, the charcoal making unit includes the first portion that houses a charcoal making material, the second portion located below the first portion and allowing a kindling material to be placed therein, and the lid covering the upper surface of the first portion. This configuration enables the charcoal making apparatus according to the present disclosure to have advantages of both of the hermetic furnace that enables carbonization at high temperatures in a short time and the open charcoal making furnace that facilitates uniform application of heat to materials. Thus, the apparatus can efficiently carbonize various materials.

In the charcoal making apparatus, the flue gas device can include a combustor housed in the flue gas device. The combustor housed in the flue gas device serves as a so-called secondary combustor. The secondary combustor is capable of making smoke from the charcoal making furnace colorless or odorless. Thus, the charcoal making apparatus has fewer locational restrictions and can be installed in an urban distinct or near houses to perform charcoal making. The charcoal making apparatus can also be provided with various types of equipment such as an electric generator utilizing thermal energy obtained from the secondary combustion device.

In the charcoal making apparatus, the passage may connect two or more charcoal making furnaces described above to one flue gas device described above. That is, the charcoal making apparatus according to the present disclosure may be a charcoal making apparatus in which two or more charcoal making furnaces are connected to one flue gas device. Each of the charcoal making furnaces includes a base and a charcoal making unit mounted on the base. Accordingly, the plurality of charcoal making units can be used interchangeably depending on materials for charcoal making and a desired timing. In the charcoal making apparatus according to the present disclosure, different materials can be carbonized at a time with the configuration in which two or more charcoal making furnaces are connected. In addition, a plurality of charcoal making processes with different degrees of progress can be performed at the same time or successively. The plurality of charcoal making processes may be performed concurrently with staggered timings so that flue gas can be continuously sent to the secondary combustion device to obtain electric power continuously by binary power generation utilizing the secondary combustion device.

In the charcoal making apparatus, the charcoal making furnace may include a casing and an inner unit. The casing may include the lid. The inner unit may include the first portion and the second portion and have a side surface that is at least partially made of a mesh. The casing may be entirely made of a steel sheet and cover an upper surface and the side surface of the inner unit. This configuration enables heat to be more uniformly applied to a charcoal making material housed in the first portion of the inner unit. Since the side surface of the inner unit is made of the mesh, when the casing is detached, the inside of the unit can be easily seen through the side surface of the inner unit. Accordingly, the state of the carbonized material can be easily observed.

In the charcoal making apparatus, in the inner unit, the first portion and the second portion may be integrated. In the case where the first portion and the second portion are integrated, the process of moving the inner unit can be easily performed.

In the charcoal making apparatus, the lid may at least partially include an opening that is openable and closable. The opening of the lid can serve as an intake port in charcoal making. In the case where the lid includes the opening, air can be taken from an upper portion of the charcoal making furnace to produce an airflow in the furnace. Accordingly, temperature distribution in the furnace can be made more uniform so that charcoal with a uniform finish can be easily obtained.

In the charcoal making apparatus, the boundary between the first portion and the second portion may be a plane at least partially including a slope. The boundary between the first portion and the second portion may be formed such that a center portion is higher than a peripheral portion. This configuration allows heat to propagate more uniformly to the charcoal making material so that charcoal with a uniform finish can be easily obtained.

DESCRIPTION OF EMBODIMENTS

One embodiment of a charcoal making apparatus according to the present invention will be described hereinafter with reference to the drawings. In the following drawings, the same or corresponding parts are denoted by the same reference numerals, and the description thereof will not be repeated.

First Embodiment

FIG. 1 illustrates a first embodiment as an example of a charcoal making apparatus according to the present disclosure. With reference to FIG. 1, a charcoal making apparatus 1 includes charcoal making furnaces 11, a flue gas device 81, and a flue gas pipe 61 as a passage. In the charcoal making apparatus 1, three charcoal making furnaces 11 are connected to one flue gas device 81 through the flue gas pipe 61. Each of the three charcoal making furnaces 11 includes a base 51 placed on the ground, and a charcoal making unit 31.

With reference to FIG. 1, the flue gas pipe 61 includes a plurality of first flue gas pipes 62 and a second flue gas pipe 63. One end of each of the first flue gas pipes 62 is connected to a furnace opening 25 (FIG. 2) disposed at the rear surface of each of the charcoal making furnaces 11. The other end of each of the first flue gas pipe 62 is connected to the second flue gas pipe 63. That is, the first flue gas pipes 62 connect the charcoal making furnaces 11 to the second flue gas pipe 63. One end of the second flue gas pipe 63 is connected to the flue gas device 81. The second flue gas pipe 63 may have a diameter larger than those of the first flue gas pipes 62. Each of the first flue gas pipes 62 is preferably at least partially made of a flexible hose. In a case where the first flue gas pipes 62 are made of flexible hoses, the first flue gas pipes 62 can be easily attached and detached to/from the furnace openings 25 (FIG. 2).

Figure 2:
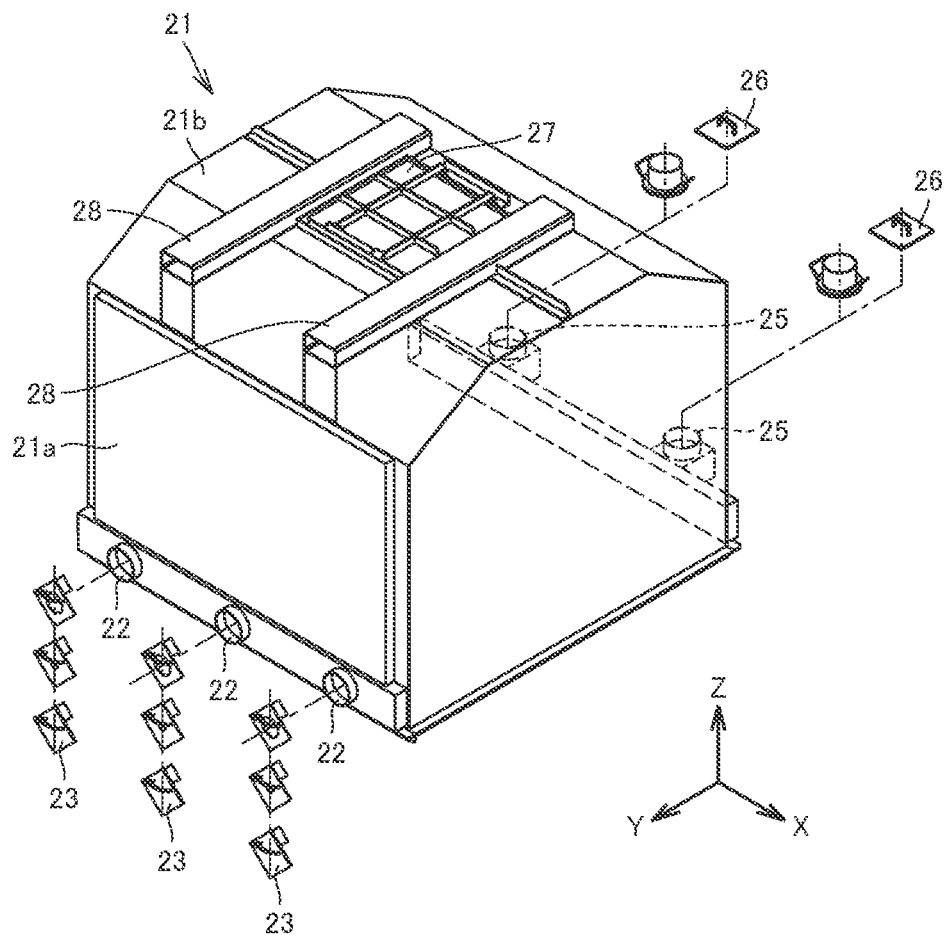
FIG. 2 is a perspective view illustrating a casing of a charcoal making furnace of the charcoal making apparatus according to the present disclosure.

The entire second flue gas pipe 63 is located at a level higher than the furnace openings 25 (FIG. 2). A fan having the function of sending air into the pipes may be provided at a position of the second flue gas pipe 63 near the flue gas device 81. The fan is preferably switched among multiple operation levels. The second flue gas pipe 63 is tilted such that a portion near the flue gas device 81 is relatively high and a portion away from the flue gas device 81 is relatively low. This configuration causes discharged smoke to flow smoothly. In addition, pyroligneous acid generated during charcoal making and discharged to the flue gas pipes can be efficiently collected. An outlet for taking out pyroligneous acid and/or a valve may be provided at a lower end of the second flue gas pipe 63.

FIG. 2 is a perspective view illustrating a casing 21 in the charcoal making furnace 11. In the following description, the X-axis directions in FIG. 2 will be referred to as width directions of the charcoal making furnace (charcoal making apparatus). A positive side in the Y axis in FIG. 2 will be referred to as a "front side" and the opposite side will be referred to as a "rear side." The positive side in the Z axis in FIG. 2 will be referred to as "top" and the opposite side will be referred to as "bottom."

With reference to FIG. 2, the casing 21 is a member constituting the charcoal making unit 31. The entire casing 21 is made of a steel sheet. When the casing 21 is mounted on the base 51 (FIG. 1), the casing 21 and the base 51 can define a closed space. The closed space herein refers to not only a space from/into which a flow of a gas is completely blocked but also a space having no arbitrarily created opening (or a closed space), and allows unintended circulation of a certain amount of air.

With reference to FIG. 2, the casing 21 includes four side walls 21a and an upper wall 21b. On the other hand, the bottom of the casing 21 has no wall surface. The bottom of the casing 21 is open. The height of a center portion of the upper wall 21b in the depth directions (Y-axis directions) is larger than the heights of a front portion and a rear portion of the upper wall 21b. A lower portion of the front side wall 21a has three first furnace openings 22 arranged at regular intervals. The first furnace openings 22 are holes (openings) that allow the inside and outside of the casing 21 to communicate with each other. Each of the first furnace openings 22 is openable and closable by detaching/attaching a lid 23. A lower portion of the rear side wall 21a has two second furnace openings 25. The second furnace openings 25 are holes (openings) that allow the inside and outside of the casing 21 to communicate with each other. Each of the second furnace openings 25 is openable and closable by detaching/attaching a lid 26.

The first furnace openings 22 are open in the horizontal directions (directions parallel to the Y axis). The first furnace openings 22 are located at positions near the lower ends of the side walls 21a and corresponding to a second portion 43 (FIG. 3) of the charcoal making unit. In starting charcoal making, a burner is inserted into one of the first furnace openings 22 to ignite a kindling material placed in the second portion 43 (FIG. 3) of the charcoal making unit. During the progress of charcoal making, the first furnace openings 22 can be used as intake ports. The amount of air to be taken into the furnace can be controlled by adjusting the number of furnace openings 22 in an open state among the three furnace openings 22. Although the three furnace openings 22 are provided in the example of FIG. 2, the number of furnace openings is not particularly limited, and may be appropriately changed depending on the capacity and purposes of the charcoal making furnace.

The second furnace openings 25 are open in the vertical directions (directions parallel to the Z axis). The second furnace openings 25 are located near the lower end of the rear side wall 21a. The second furnace openings 25 are closable with the lid 26, and the first flue gas pipes 62 are detachably attached to the second furnace openings 25. In charcoal making, the second furnace openings 25 can be used as exhaust ports. That is, in the charcoal making furnace 11, a flow of air taken from the first furnace openings 22 and discharged from the second furnace openings 25 can be created. The second furnace openings 25 are provided at two positions. The first flue gas pipes 62 may be connected to both of the two furnace openings 25. The first flue gas pipe 62 may be connected to only one of the two furnace openings 25, and the other furnace opening 25 may be closed with the lid 26. Although the two furnace openings 25 are provided in the example of FIG. 2, the number of furnace openings is not particularly limited and may be appropriately changed depending on the capacity of purposes of the charcoal making furnace.

A lid 27 is provided at a center portion of the upper wall 21b of the casing 21. The lid 27 is substantially a square. The lid 27 is provided with a hinge at one side to be openable and closable. The lid 27 can also be used as an intake port. The position of the lid 27 is not limited to the center of the upper surface of the casing 21. For example, the lid 27 may be located at a center portion of the front side of the upper wall 21b in the width directions (X-axis directions). The lid 27 may also be located at a center portion of the rear side of the upper wall 21b in the width directions (X-axis directions). Further, two or more lids 27 may be provided. The shape of the lid 27 is not limited to a quadrilateral and may be, for example, a circle. The presence of the lid 27 creates a flow of air taken from an upper portion of the charcoal making furnace 11 and discharged from the second furnace openings 25 in a lower portion of the charcoal making furnace 11 can be created.

Hooks 28 are provided on the upper wall 21b of the casing 21. The hooks 28 are a pair of tubular portions in which forks of a forklift can be inserted. The forks can be inserted into the hooks 28 to move the casing 21. The configuration of the hooks 28 is not limited to this example. For example, loop-shaped hooks may be provided at a plurality of positions on the upper surface of the casing so that the casing can be hung by a crane.

Figure 3:
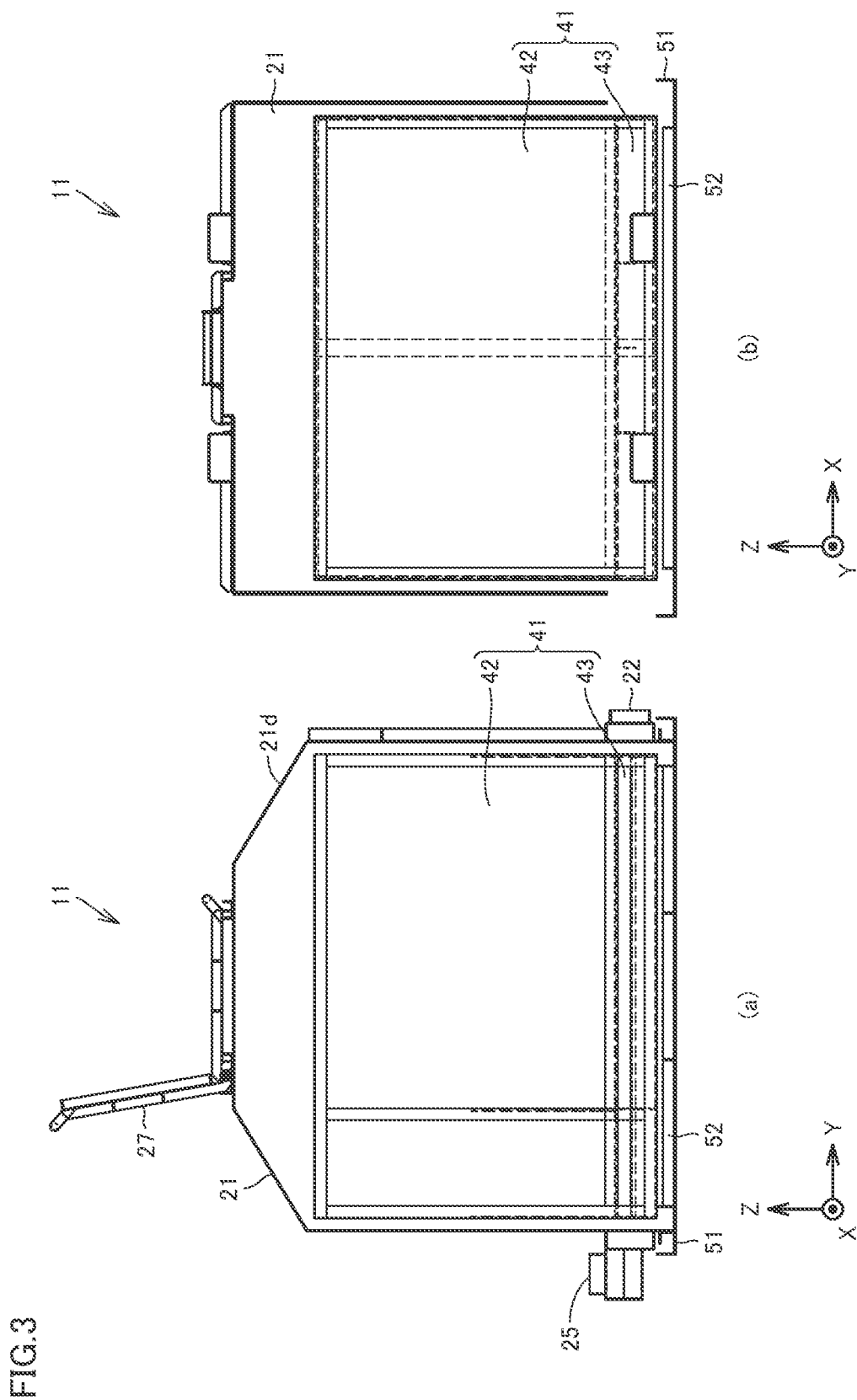
FIG. 3 is a schematic view illustrating a structure of the charcoal making furnace of the charcoal making apparatus according to the present disclosure.

FIG. 3 is a schematic view illustrating a configuration of the charcoal making furnace 11. To facilitate understanding, the configuration is partially omitted. FIG. 3(a) shows a state where the charcoal making furnace 11 is seen from a side. FIG. 3(b) shows a state where the charcoal making furnace 11 is seen from the front and schematically illustrates the casing 21, an inner unit 41, and the base 51 that are separated from one another. With reference to FIGS. 3(a) and 3(b), the charcoal making furnace 11 includes the base 51, the casing 21, and the inner unit 41. The casing 21 and the inner unit 41 constitute the charcoal making unit 31. The inner unit 41 includes a first portion 42 and the second portion 43. The inner unit 41 is housed in a space defined by the base 51 and the casing 21. A heat-resistant panel 52 is disposed at the center of the base 51. The inner unit 41 is mounted on the heat-resistant panel 52. The casing 21 is placed from above to cover the entire inner unit 41. The casing 21 is a lid covering the upper surface and side surfaces of the inner unit 41. The heat-resistant panel 52 may be a previously shaped panel or a structure obtained by pouring a heat-resistant material into a mold and solidifying the material. The heat-resistant panel is provided to enhance a heat retaining property of the charcoal making furnace.

Figure 4:
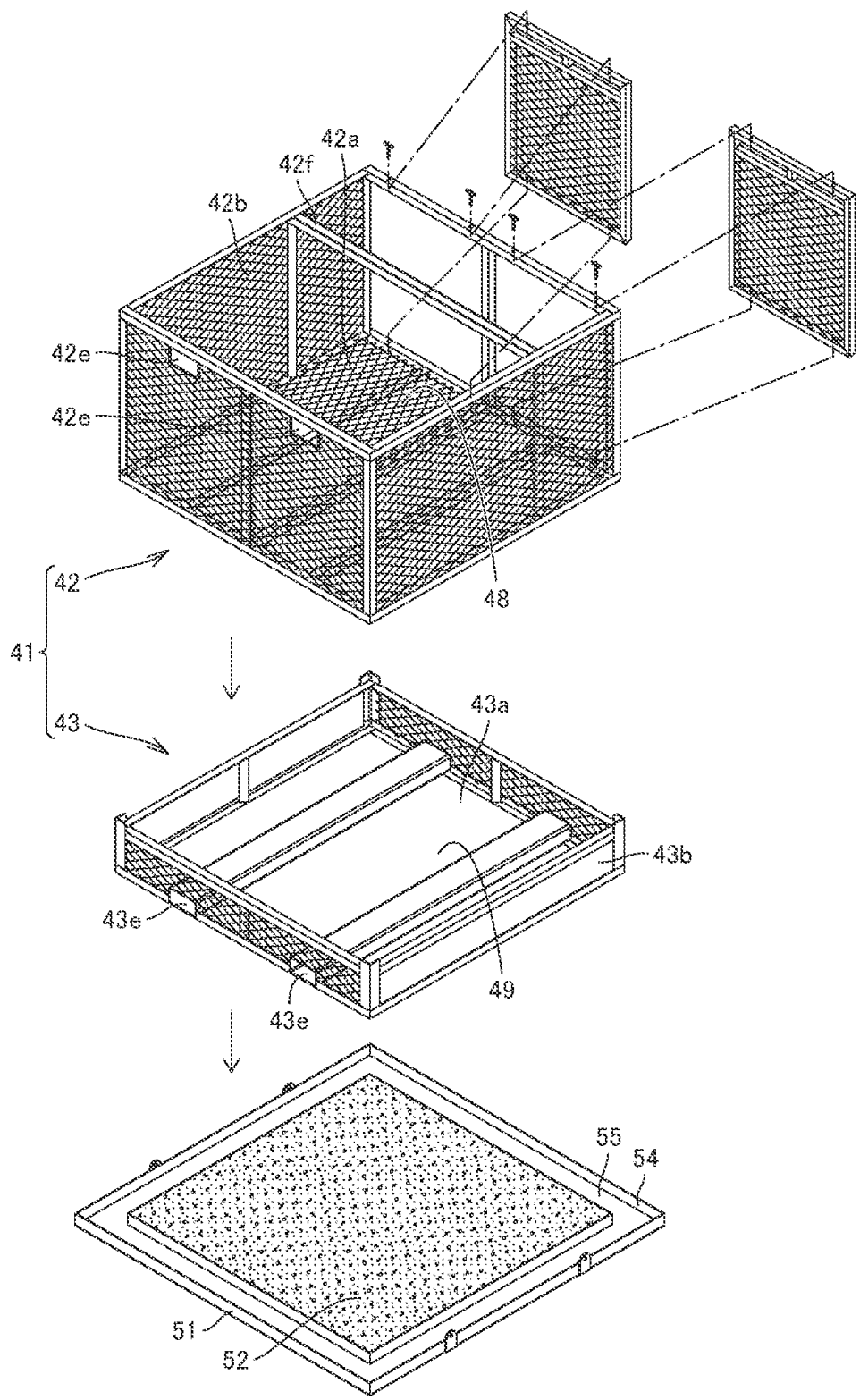
FIG. 4 is a disassembled perspective view illustrating a structure of an inner unit and a base of the charcoal making furnace according to the present disclosure.

FIG. 4 is a disassembled perspective view illustrating a configuration of the inner unit 41 and the base 51. With reference to FIG. 4, the base 51 includes a quadrilateral bottom surface 55, a peripheral wall 54 rising from the periphery of the bottom surface 55, and the heat-resistant panel 52 located at the center of the bottom surface 55. The peripheral wall 54 enables water, gravel, and other substances to be accumulated on the base 51. Hermeticity between the casing 21 and the base 51 can be enhanced by placing water, gravel, and/or other substances between the peripheral wall 54 and the heat-resistant panel 52 before or after the casing 21 is mounted on the base 51. Instead of water and gravel, a gelled substance may be used, for example. Dimensions of the bottom surface 55 of the base 51 are not particularly limited, and the bottom surface 55 may be formed in a square whose side is 2000 to 2500 mm, for example. The height of the peripheral wall 54 is not particularly limited, and may be, for example, 50 to 100 mm. The range may be, of course, beyond the ranges described above. The height of the heat-resistant panel 52 may be, for example, about 50 to 100 mm.

The inner unit 41 is mounted on the base 51. The inner unit 41 includes a first cage 42 constituting a first portion of the charcoal making unit and a second cage 43 constituting a second portion of the charcoal making unit. The first cage 42 houses a charcoal making target. The second cage 43 can house a kindling material.

The first cage 42 includes a quadrilateral bottom surface 42a and four side surfaces 42b rising from the periphery of the bottom surface 42a. The upper surface of the first cage 42 is open. A space surrounded by the bottom surface 42a and the side surfaces 42b is a first portion 48 as a housing portion of a charcoal raw material. Each of the bottom surface 42a and the side surfaces 42b is made of a metal mesh material. Examples of the mesh material include an expanded metal and a perforated metal each having a desired aperture. The type of the mesh material can be selected based on the type and fineness of the charcoal raw material. For example, to make charcoal from chaff, a mesh material having an aperture of about 3 to 5 mm can be used. In making charcoal from a larger material, each of the cages is preferably made of a mesh having a larger aperture. The side surfaces 42b of the first cage 42 is partially detachable. Since the side surfaces 42b are partially detachable, a charcoal making material and resulting charcoal can be easily placed in and out of the furnace. An upper portion of the front surface in the side surfaces 42b of the first cage 42 has two holes 42e. The two holes 42e are disposed at an interval corresponding to the interval of a pair of forks of a forklift. The first cage 42 includes a reinforcing material 42f attached to the upper surface along the width directions. The forks can be inserted to reach the reinforcing material 42f from the holes 42e. The first cage 42 can be moved or conveyed with a forklift.

In the example illustrated in FIG. 4, the entire bottom surface 42a of the first cage 42 is made of the mesh. Alternatively, only a portion of the bottom surface 42a may be made of a mesh. For example, a portion of the bottom surface 42a of the bottom surface 42a in the width directions (e.g., a center portion) may be made of a mesh extending from a front side to a rear side of the bottom surface 42a, and the other portion of the bottom surface 42a may be made of a steel sheet. Similarly, a portion of the side surfaces 42b may be made of a mesh, and another portion of the side surfaces 42b may be made of a steel sheet.

Dimensions of the first cage 42 are not particularly limited. For example, the bottom surface 42a can be shaped in a square whose side is 1000 to 2500 mm. The height of each side surface 42b is not particularly limited, either, and can be 800 to 2000 mm, for example. The range may be, of course, beyond the ranges described above.

With reference to FIG. 4, the second cage 43 includes a quadrilateral bottom surface 43a and four side surfaces 43b rising from the periphery of the bottom surface 43a. The upper surface of the second cage 43 is open. A space surrounded by the bottom surface 43a and the side surfaces 43b is a second portion 49 in which a kindling material can be placed. The bottom surface 43a is made of a steel sheet or a heat-resistant panel. Among the side surfaces 43b, the front surface and the rear surface are each made of a mesh material. Two of the side surfaces 43b at both sides are each made of a steel sheet or a heat-resistant panel. As the mesh material, the same material as the mesh material constituting the first cage 42 can be used. Two parallel pipe conducts 43e are provided on the bottom surface 43a and extend from the front surface to the rear surface. The pipe conducts 43e are disposed at an interval corresponding to the interval between a pair of forks of a forklift. The forks are inserted into the pipe conducts 43e to thereby move or convey the second cage 43 with the forklift.

Dimensions of the second cage 43 can correspond to dimensions of the first cage 42. Specifically, the length of one side of the bottom surface 43a of the second cage 43 is equal to or slightly larger (by about 10 to 50 mm) than the length of one side of the bottom surface 42a of the first cage 42. The dimensions of the bottom surface of the second cage 43 are slightly larger than those of the first cage 42 so that positioning in stacking the first cage 42 on the second cage 43 can be made easy. The height of the second cage 43 is not particularly limited, and can be 200 to 400 mm, for example. The height may be, of course, beyond the range described above.

In operating the charcoal making furnace 11, the second cage 43 is mounted on the base 51, and the first cage 42 is placed on the second cage 43. That is, the second portion 49 is disposed above the base 51 and below the first portion 48. The first portion 48 and the second portion 49 are partitioned by the bottom surface 42a. In charcoal making, the casing 21 (FIG. 2) is further placed thereon to cover the entire inner unit 41.

Although the first cage 42 and the second cage 43 are separated from each other in the inner unit 41 illustrated in FIG. 4, the first cage 42 and the second cage 43 may be integrated. In the case where the first cage 42 and the second cage 43 are integrated, the bottom surface 42a may be at least partially detachable. The surfaces of the second cage 43 may be partially detachable. A portion of the side surfaces of the second cage 43 is not provided with any of a mesh and a wall surface, and may be open. These configurations enable a kindling material to be easily supplied to the second portion 49.

In the charcoal making furnaces 11 according to the present disclosure, the kindling material is placed in the second portion 49 and is burnt so that a charcoal making target housed in the first portion 48 can be heated from the bottom. Accordingly, the charcoal making target can be uniformly heated so that charcoal with uniform quality can be easily obtained. In addition, the casing 21 covers the inner unit 41 to thereby create the state of a hermetic furnace. Accordingly, high temperatures are maintained and heat is efficiently circulated so that charcoal making can be thereby performed in a short time.

First Variation of Inner Unit

Figure 5:
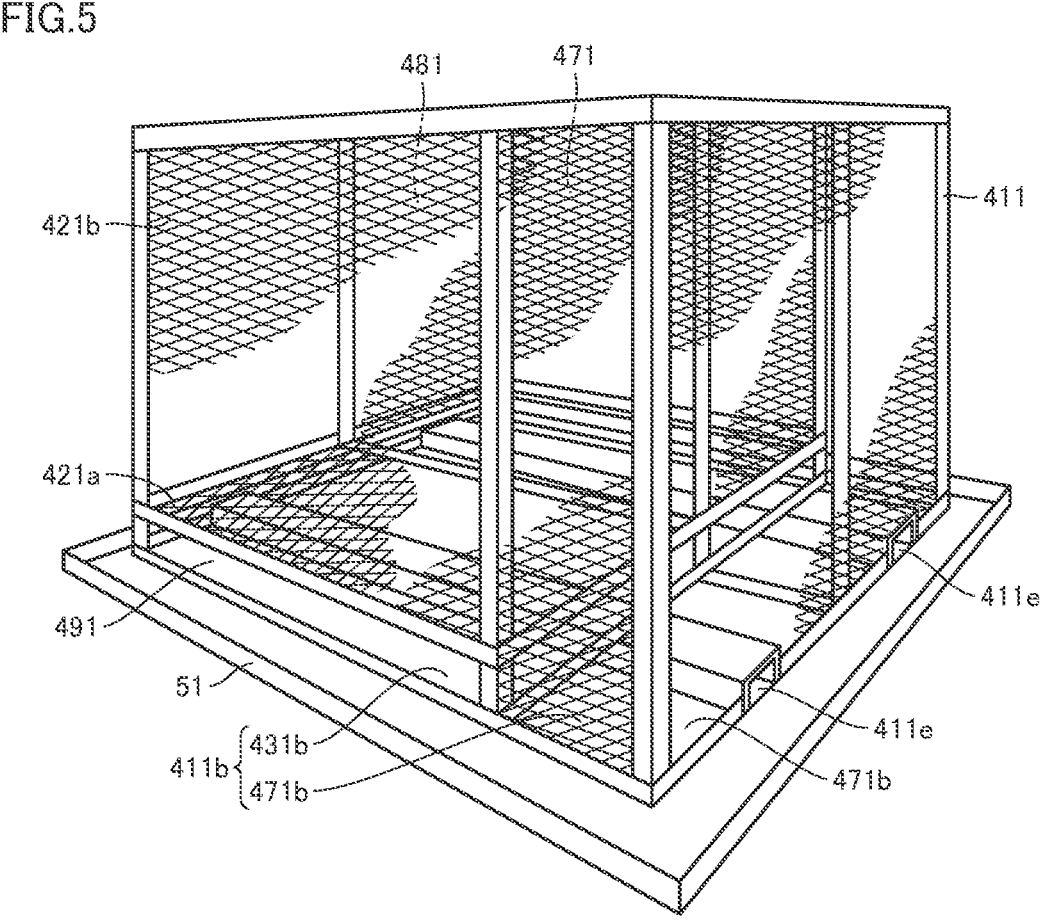
FIG. 5 is a perspective view illustrating an example of the inner unit of the charcoal making furnace according to the present disclosure.
Figure 5:
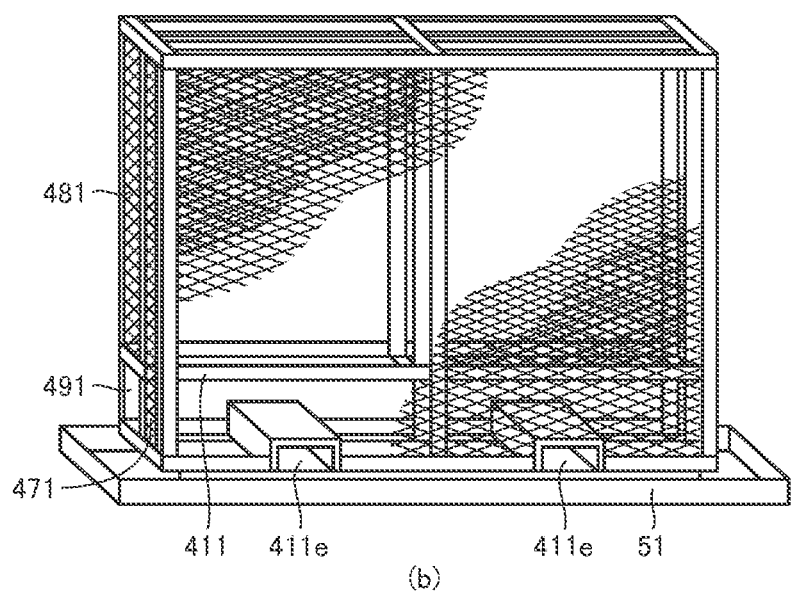

FIG. 5 is a perspective view illustrating an inner unit 411 as a variation of the inner unit. FIGS. 5(a) and (b) both illustrate the inner unit 411 but show the inner unit 411 in different directions. The following description is directed mainly to a difference between the inner unit 411 and the inner unit 41. With reference to FIG. 5, the inner unit 411 includes a first portion 481 and a second portion 491. The inner unit 411 also includes a third portion 471 located at the front of the first portion 481 and the second portion 491. In the inner unit 411, a charcoal making material can be supplied to the first portion 481. The second portion 491 is located below the first portion 481. The third portion 471 is located at the front of the first portion 481 and the second portion 491 and extends in the entire region of the inner unit 411 in the height direction. A dimension of the third portion 471 in the depth directions is smaller than a dimension of each of the first portion 481 and the second portion 491 in the depth directions. Specifically, the dimension of the third portion 471 in the depth directions is about ⅓ of the dimension of each of the first portion 481 and the second portion 491 in the depth directions.

In the inner unit 411, the first portion 481 and the second portion 491 are partitioned by a bottom surface 421a of the first portion 481. The bottom surface 421a is made of a mesh. Four side surfaces 421b of the first portion 481 are also each made of a mesh. A bottom surface 431b of the second portion 491 is continuous with a bottom surface 471b of the third portion 471 and is made of a steel sheet or a heat-resistant panel. A bottom surface 411b of the inner unit 411 includes the bottom surface 431b of the second portion 491 and the bottom surface 471b of the third portion 471. The second portion 491 includes no side wall surfaces. The upper surface (i.e., the upper surface of the first portion 481 and the upper surface of the third portion 471) of the inner unit 411 is open. A most part of the inner unit 411 is made of a mesh material except for the bottom surface 411b and a frame material constituting the contour of the inner unit 411.

In the inner unit 411, two parallel pipe conducts 411e extending in the depth directions are provided on the bottom surface 411b. The pipe conducts 411e are disposed at an interval corresponding to the interval between a pair of forks of a forklift. The forks are inserted in the pipe conducts 411e to thereby move or convey the inner unit 411 with the forklift. In the inner unit 411, since the first portion 481, the second portion 491, and the third portion 471 are integrated, the inner unit 411 can be easily placed on the base 51 and easily moved from the base 51.

The inner unit 411 allows a kindling material to be supplied to the third portion 471. A kindling material may also be supplied to the second portion 491. The presence of the second portion 491 and the third portion 471 enables the inner unit 411 to rapidly and uniformly apply heat to a charcoal making material housed in the first portion 481. In the inner unit 411, since the charcoal making material can be heated from both the front surface and the bottom surface, the charcoal making material can be rapidly and uniformly heated. The inner unit 411 can be mounted on the base 51 described above, and can be housed in the casing 21 (FIG. 2) described above.

Second Variation of Inner Unit

Figure 6:
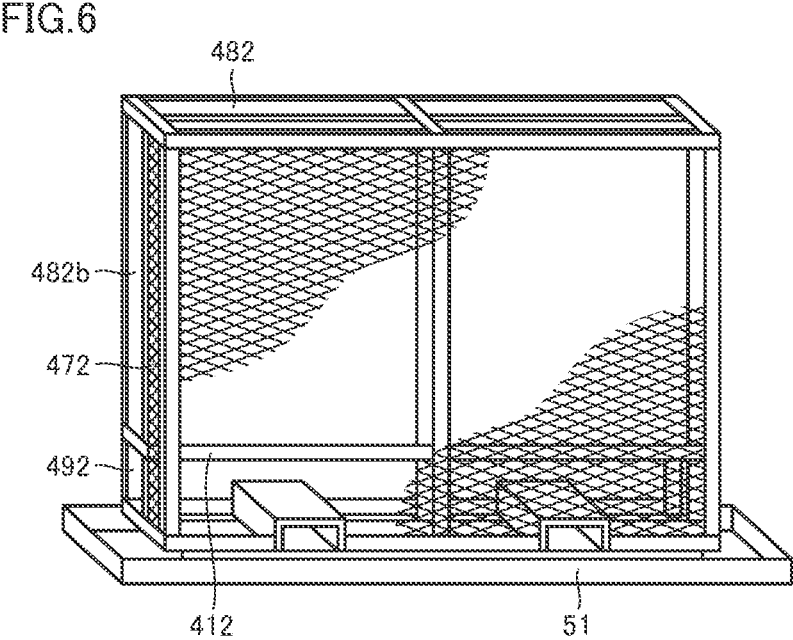
FIG. 6 is a perspective view illustrating an example of the inner unit of the charcoal making furnace according to the present disclosure.

FIG. 6 is a perspective view illustrating an inner unit 412 as a variation of the inner unit. With reference to FIG. 6, the inner unit 412 includes a first portion 482 and a second portion 492. The inner unit 412 also includes a third portion 472 located at the front of the first portion 482 and the second portion 492. In the inner unit 412, a charcoal making material can be supplied to the first portion 482. The second portion 492 is located below the first portion 482. The third portion 472 is located at the front of the first portion 482 and the second portion 492 and extends in the entire region of the inner unit 412 in the height directions.

The inner unit 412 has the same configuration as that of the inner unit 411 in most part, and the same components will not be described again. In the inner unit 412, side surfaces 482b of the first portion 482 are each made of a sheet material such as a steel sheet. In the case where the side surfaces 482b are each made of a sheet material, advantages of enhanced heat retaining properties and capability of housing fine materials are obtained.

Third Variation of Inner Unit

Figure 7:
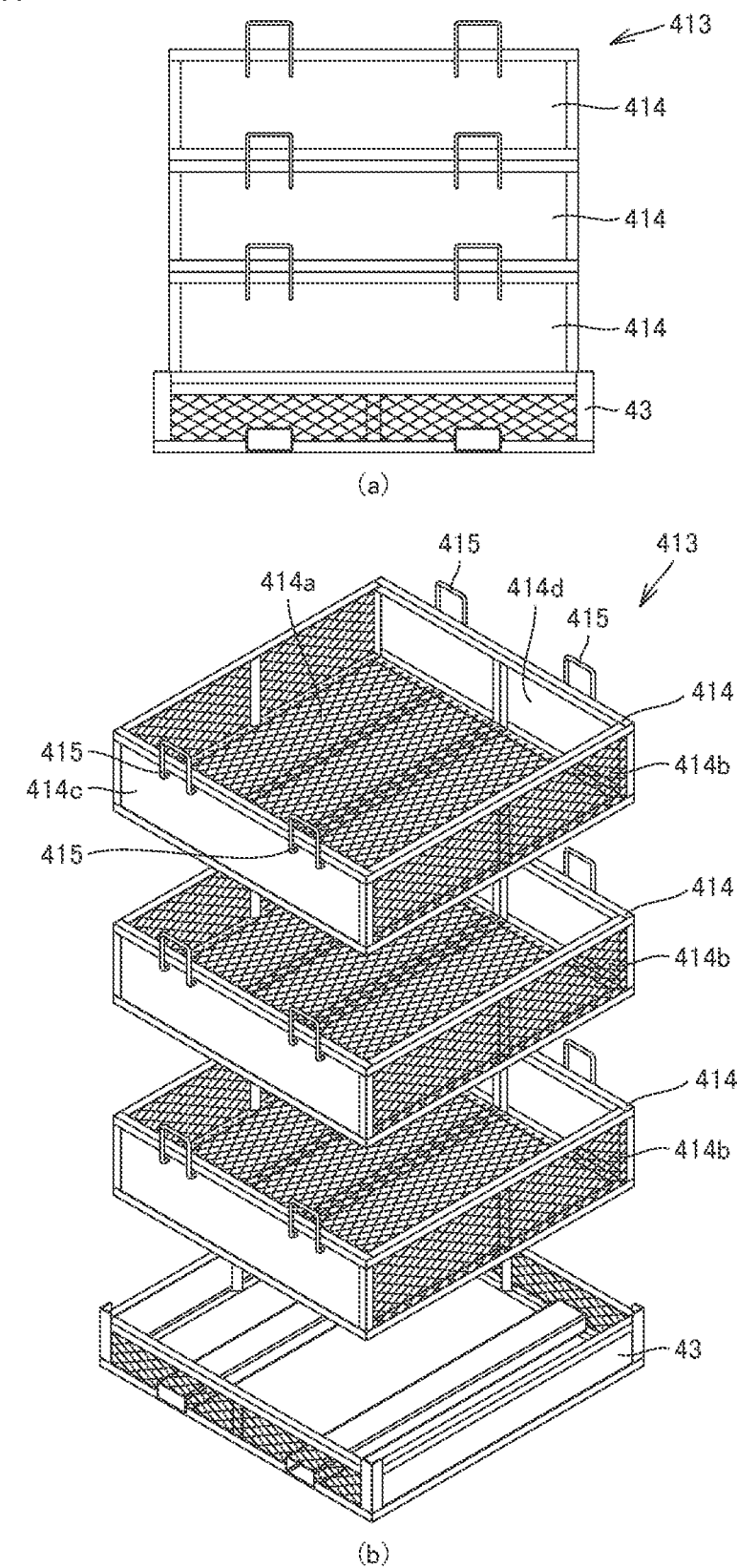
FIG. 7 shows a front view and a disassembled perspective view illustrating an example of the inner unit of the charcoal making furnace according to the present disclosure.

FIG. 7 is a perspective view illustrating an inner unit 413 as a variation of the inner unit. FIG. 7(a) is a front view of the inner unit 413. FIG. 7(b) is a disassembled perspective view of the inner unit 413. With reference to FIGS. 7(a) and 7(b), the inner unit 413 includes first cages 414 and a second cage 43. The second cage 43 can house a kindling material. The second cage 43 is similar to that shown in FIG. 4. Three first cages 414 are stacked to constitute a first portion of a charcoal making unit. Each of the first cages 414 can house a charcoal making target. A bottom surface 414a of each first cage 414 is made of a mesh. Both side surfaces 414b of the first cage 414 are each made of a mesh. A front surface 414c and a rear surface 414d of the first cage 414 are each made of a sheet material. Two hooks 415 are provided at the upper end of each of the front surface 414c and the rear surface 414d of the first cage 414. Forks of a forklift can be inserted in the hooks 415. Two of the four side surfaces are made of meshes and the other two side surfaces are made of sheet materials in the example illustrated in FIG. 7, but the present disclosure is not limited to this example. For example, all of the four surfaces may be made of meshes, or all of the four surfaces may be made of sheet materials. Although three first cages 414 are stacked in the example illustrated in FIG. 7, two or four or more first cages 414 may be stacked. It is sufficient that multiple first cages 414 are stacked.

In charcoal making, a casing is placed over the inner unit 413 to thereby constitute a hermetic furnace. As the casing, the casing 21 (FIG. 3) can be used. The inner unit 413 is suitable for making charcoal from materials with high water content or heavy materials. The inner unit 413 can also be used as a drying rack for drying a material in a stage before carbonization. In addition, at this time, drying is also preferably performed by utilizing heat from another charcoal making unit in the charcoal making apparatus or heat obtained from a secondary combustor.

First Variation of Charcoal Making Unit

Figure 8:
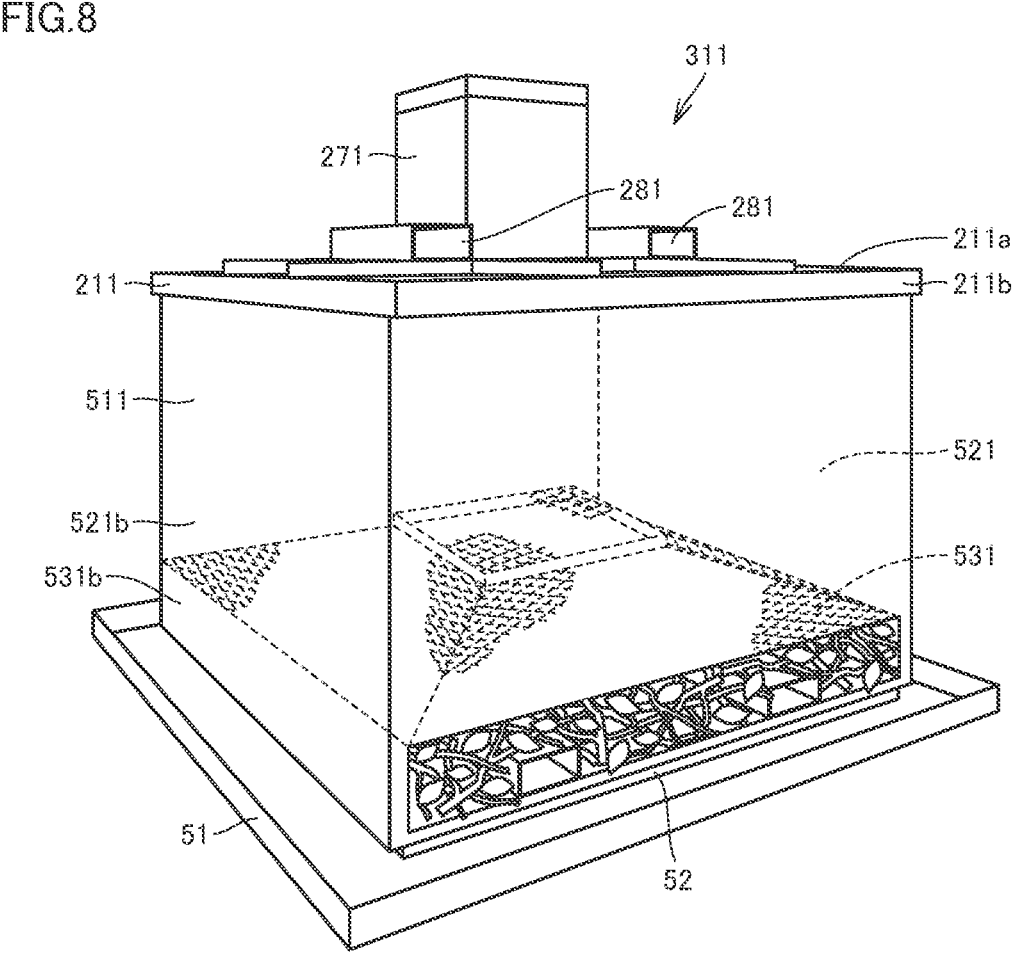
FIG. 8 is a perspective view illustrating an example of a charcoal making unit of the charcoal making furnace according to the present disclosure.
Figure 9:
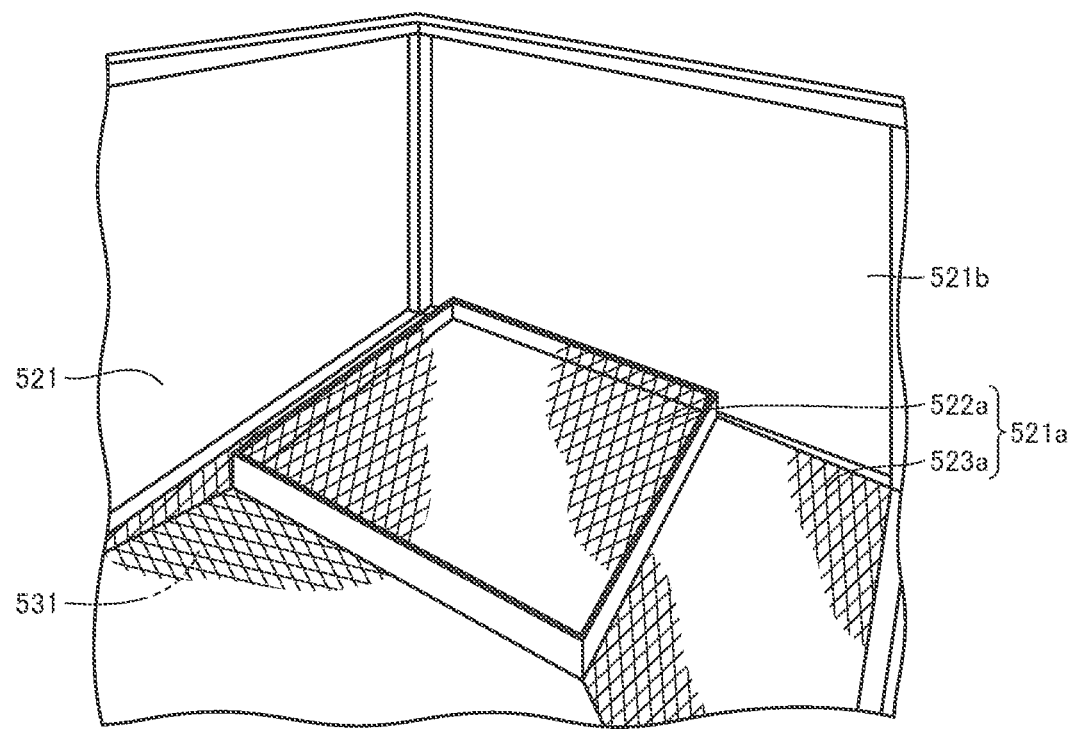
FIG. 9 is a perspective view illustrating a portion of the charcoal making unit of the charcoal making furnace according to the present disclosure.

FIG. 8 is a perspective view illustrating a charcoal making unit 311 as a variation of the charcoal making unit. FIG. 9 is a perspective view illustrating the inside of a furnace body 511 in the charcoal making unit 311. With reference to FIG. 8, the charcoal making unit 311 is mounted on a base 51. The charcoal making unit 311 includes the furnace body 511 and a lid 211.

The entire lid 211 is made of a steel sheet. The lid 211 includes a flat upper surface 211a and four edge surfaces 211b extending downward from the periphery of the upper surface. The lid 211 covers the upper surface of the furnace body 511. The lid 211 is provided with an intake cylinder 271 that is a quadrilateral cylinder extending upward. An upper portion of the intake cylinder 271 is provided with a lid that can be opened and closed. The intake cylinder 271 can be used as an intake port during charcoal making. Two parallel hooks 281 are provided on the lid 211. Forks of a forklift can be inserted in the hooks 281 to thereby move or convey the lid 211.

With reference to FIG. 9, the inside of the furnace body 511 is partitioned into a first portion 521 that houses a charcoal making target and a second portion 531 located below the first portion. A bottom surface 521a of the first portion 521 is made of a mesh. That is, a boundary between the first portion 521 and the second portion 531 is made of a mesh. A kindling material can be supplied to the second portion 531.

The bottom surface 521a of the first portion 521 includes a quadrilateral center portion 522a and four slopes 523a connecting the sides of the center portion 522a to side surfaces 521b of the first portion 521. That is, the bottom surface 521a is shaped in a bottomless truncated pyramid in which the center portion 522a is higher than the periphery. The center portion 522a is detachable so that a kindling material can be placed supplied to the second portion 531 through the center portion 522a. The shape of the bottom surface 521a is not limited to this example, and may be a flat surface or a bottom surface tilted in one direction as a whole. For example, the bottom surface 521a may be a slope tilted from the front side to the rear side. The bottom surface 521a may not include a center flat portion and may be formed as a side surface of a pyramid tilted toward the center as a whole.

With reference to FIG. 8, in the furnace body 511, the first portion 521 and the second portion 531 are integrated. Two of the side surfaces 521b of the first portion and the side surfaces 531b of the second portion 531 at the sides are each made of an integrated steel sheet. A front side surface of the side surfaces 531b of the second portion 531 is open. A kindling material can be supplied through this opening. FIG. 8 shows a state where twigs and leaves are placed as a kindling material.

In the charcoal making unit 311, the upper surface of the furnace body 511 can be covered with a lid 211. The charcoal making unit 311 may perform charcoal making without using a casing covering the entire furnace body 511. The charcoal making unit 311 may be further covered with a casing. As the casing used in this case, the casing 21 (FIG. 2) may be used, for example. The intake cylinder 271 may be taken out of the casing 21 by opening the lid 27 of the casing 21.

Second Variation of Charcoal Making Unit

Figure 10:
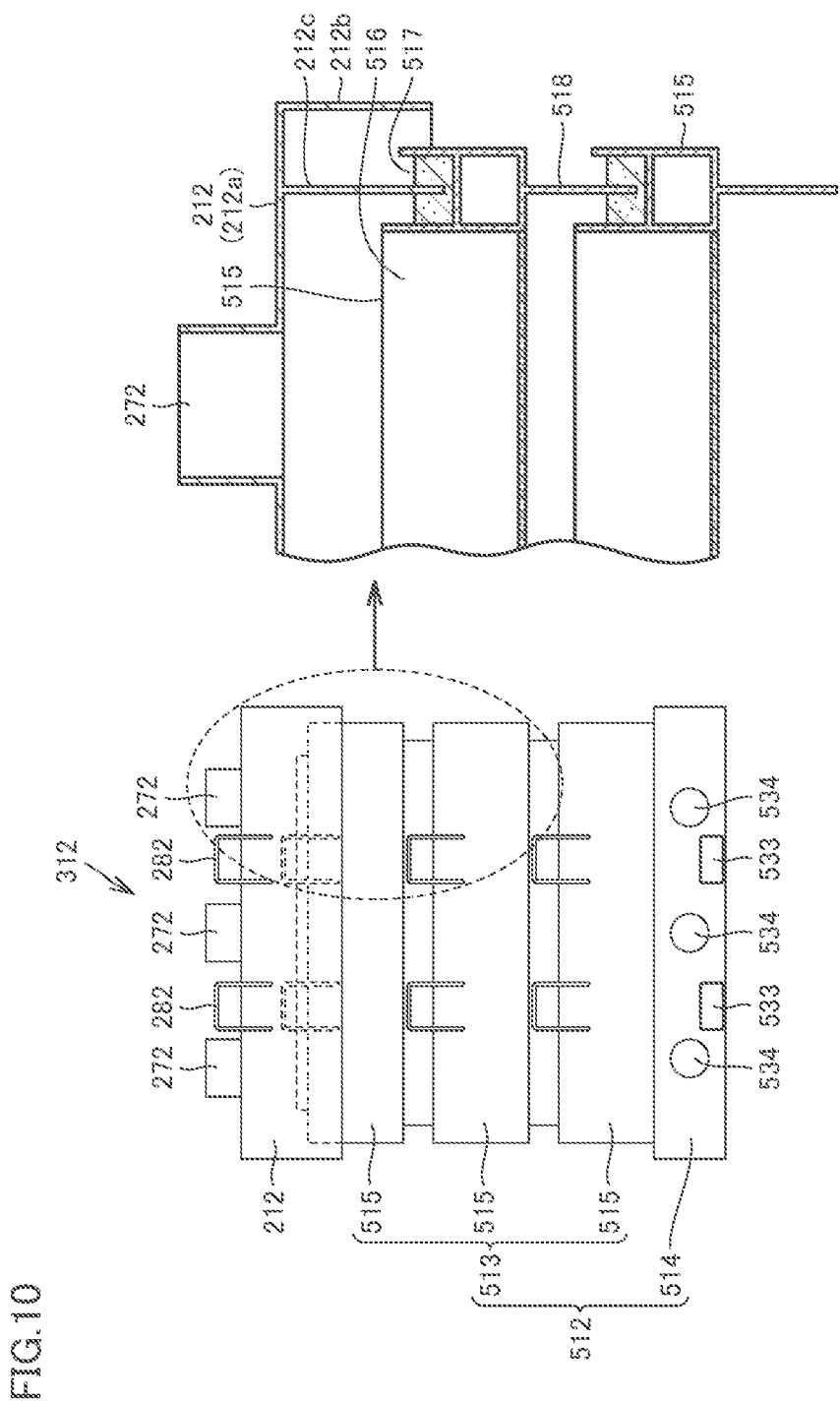
FIG. 10 shows a front view and a partial enlarged cross-sectional view illustrating an example of the charcoal making unit of the charcoal making furnace according to the present disclosure.

FIG. 10 shows a front view and a partial cross-sectional enlarged view illustrating a charcoal making unit 312 as a variation of the charcoal making unit. With reference to FIG. 10, the charcoal making unit 312 includes a furnace body 512 and a lid 212. The charcoal making unit 312 can be mounted on a base. The furnace body 512 includes a first portion 513 that houses a charcoal making target and is open at the upper surface, and a second portion 514 which is located below the first portion 513 and to which a kindling material is supplied. The first portion 513 includes a stack of three trays 515.

With reference to FIG. 10, the lid 212 includes a flat upper surface 212a and four edge surfaces 212b extending downward from the periphery of the upper surface. The upper surface 212a of the lid 212 is provided with three intake cylinders 272 that are quadrilateral cylinders extending upward. Two parallel hooks 282 are provided on the upper surface 212a of the lid 212. Forks of a forklift can be inserted in the hooks 282 to thereby move or convey the lid 212. The edge surface of the lid 212 has a double structure, and includes four edge surfaces 212c at the inner side of the edge surfaces 212b. The edge surfaces 212b are located outward of an outer peripheral surface of each tray 515 and covers the outer circumference of an upper portion of the tray 515. The edge surfaces 212c enter an outer peripheral portion 517 disposed at the outer periphery of a box portion 516 that is a charcoal raw material housing portion of the tray 515. The outer peripheral portion 517 is filled with sand. The edge surfaces 212c are buried in the sand filling the outer peripheral portion 517 so that the inside of the furnace body 512 is shielded from the outside to thereby create a closed space. The edge surfaces 212b prevent entering of rains and the like in the furnace body 512. In the second portion 514 to which a kindling material is supplied, each of the bottom surface and the side surfaces is made of a sheet material. A front surface of the second portion 514 has two inlets for pipe conducts 533 in which forks of a forklift can be inserted. The front surface of the second portion 514 has three furnace openings 534 to which the lid can be attached.

Figure 11:
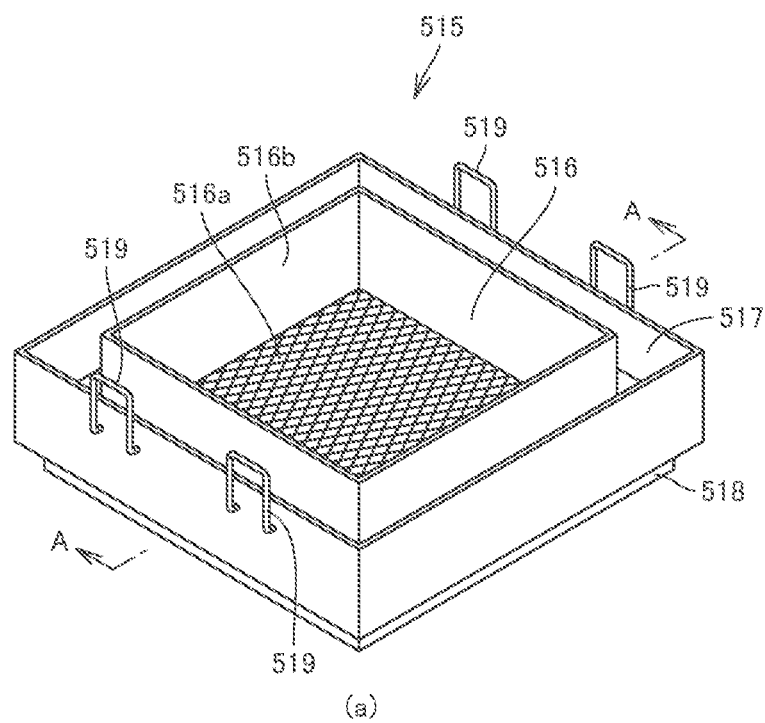
FIG. 11 shows a perspective view and a cross-sectional view of a tray included in the charcoal making unit of the charcoal making furnace according to the present disclosure.
Figure 11:
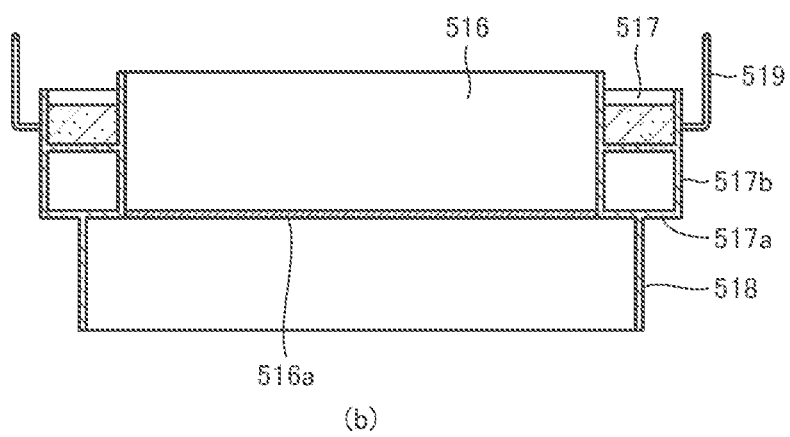

FIG. 11 illustrates a structure of the tray 515. FIG. 11(a) is a perspective view of the tray 515. FIG. 11(b) is a cross-sectional view taken along A-A in FIG. 11(a). With reference to FIG. 11, the tray 515 has a box structure that is open at the upper surface. The tray 515 includes the box portion 516 that houses a charcoal raw material, the outer peripheral portion 517 disposed at the entire outer periphery of the box portion 516, and a skirt 518 projecting downward from a bottom surface 517a of the outer peripheral portion 517. A bottom surface 516a of the box portion 516 is made of a mesh. Side surfaces 516b of the box portion 516 are each made of a sheet material. The bottom surface 517a and side surfaces 517b of the outer peripheral portion 517 are each made of a sheet material. The outer peripheral portion 517 may be constituted by two upper and lower parts. The outer peripheral portion 517 is filled with sand and gel, for example. In the charcoal making unit 312, the plurality of trays 515 are stacked. The three trays 515 are stacked in the example of FIG. 11 but two or four or more trays may be stacked. The number of the trays 515 may also be changed depending on the amount and type of a charcoal raw material. In stacking the trays 515, the skirt 518 of the upper tray 515 enters the outer peripheral portion 517 of the lower tray 515 so that the inside of the furnace body 512 is shielded from the outside to thereby create a closed space. The side surfaces 517b of the outer peripheral portion 517 are provided with two pairs of hooks 519. Forks of a forklift can be inserted in the hooks 519.

Other Variations

The base and the charcoal making unit have quadrilateral bottom surfaces in the embodiments described above, but the present disclosure is not limited to these examples. For example, the base may have a disc shape, and the charcoal making unit may have a cylindrical shape. The base has a basin shape in the embodiments described above, but the present disclosure is not limited to this example. The base may be placed on the ground or may be partially embedded in the ground, for example.

Figure 12:
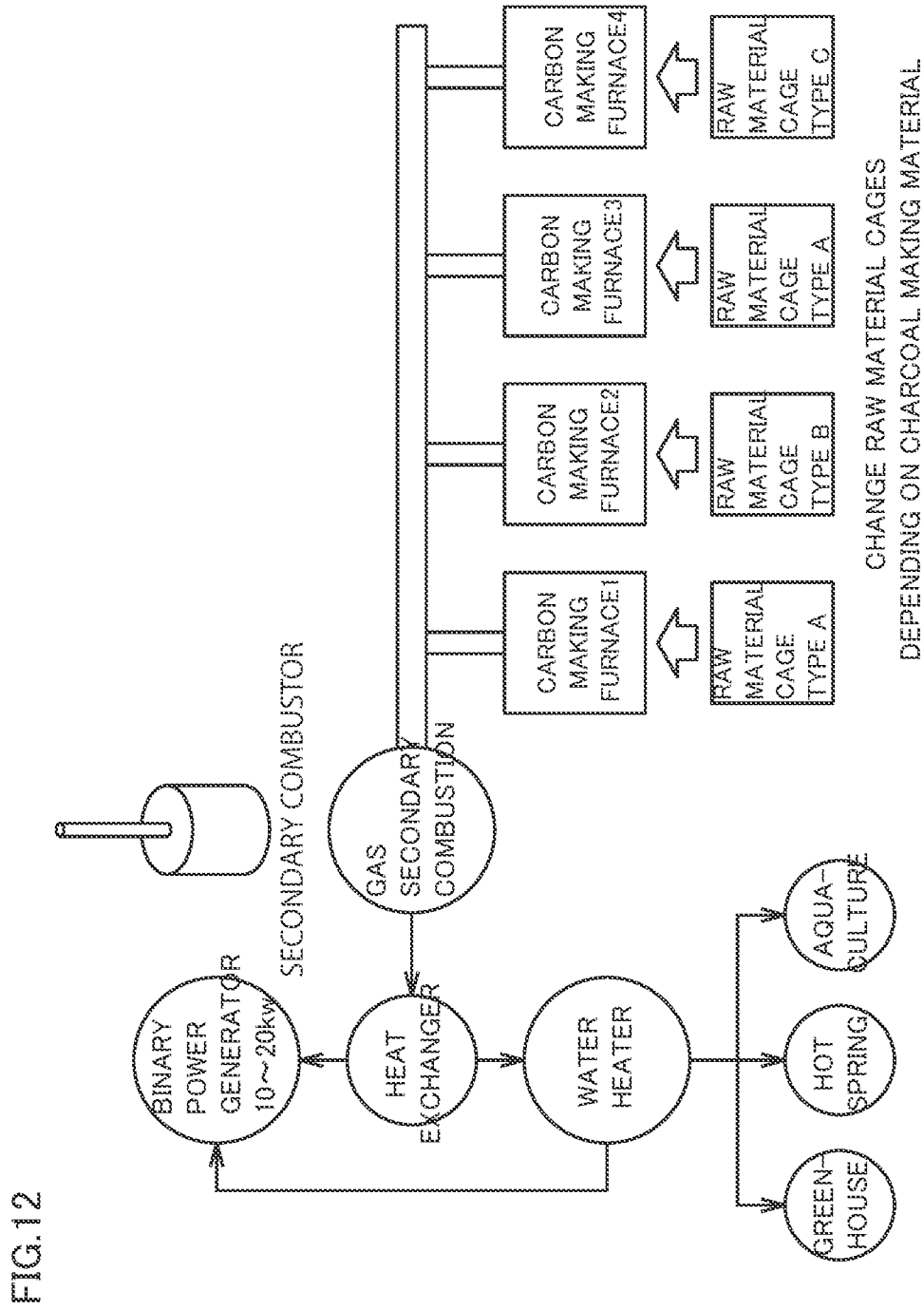
FIG. 12 is a schematic view showing a mode of use of the charcoal making apparatus according to the present disclosure.

FIG. 12 is a schematic view illustrating a mode of use of the charcoal making apparatus according to the present disclosure. With reference to FIG. 12, the charcoal making apparatus can include a plurality of charcoal making furnaces (four charcoal making furnaces in FIG. 12). The plurality of charcoal making furnaces are connected to the secondary combustor serving as a flue gas device through the flue gas passage. The secondary combustor incorporates a combustor therein. The secondary combustor can employ a known configuration. The combustor of the secondary combustor uses a gas or gasoline as a fuel and heats smoke discharged from the charcoal making furnace again for combustion. As a fuel in the secondary combustor, charcoal produced by the charcoal making apparatus according to the present disclosure can also be used. The charcoal making apparatus according to the present disclosure is a non-powered device that does not require an electric power supply and a power source.

A charcoal making unit in each charcoal making furnace can selectively use an appropriate unit depending on a raw material for making charcoal. This charcoal making unit can be the charcoal making unit of the embodiments described above. The plurality of charcoal making furnaces may use the same charcoal making unit or may use different charcoal making units.

The secondary combustor may include a heat exchanger and/or a boiler. Through the heat exchanger in the secondary combustor, various media can be heated and/or hot water can be obtained by heating water, for example. The obtained hot water can be used for supplying electric power with a binary power generation device. The hot water can also be used for applications such as heating of a greenhouse and adjustment of water temperature in a hot spring or aquaculture, for example.

Method for Making Charcoal with Charcoal Making Apparatus

An example of a method for making charcoal with the charcoal making apparatus 1 will be described. The method will be generally described below. Specifically, a charcoal making target is supplied to the first portion of the charcoal making unit. In the case of using a plurality of charcoal making units, the same charcoal making target may be supplied to the charcoal making units or different types of charcoal making targets may be carbonized at the same time. Before or after a charcoal making target is supplied to the first portion, an inner unit is mounted on the base. A kindling material is placed in the second portion. After the charcoal making material and the kindling material have been supplied, the casing is placed over the inner unit.

An ignition burner is inserted through a hole in the front surface of the casing to ignite the kindling material. Air may be sent into the casing when necessary. After the ignition, carbonization is caused to proceed while the amount of intake air from the hole in the front surface of the casing and the intake cylinder is measured and the temperature of an exhaust gas from the flue gas passage is observed. The progress of carbonization can be adjusted by adjusting the operation level of a fan in the flue gas device in accordance with the intake amount and/or the temperature of an exhaust gas. The measurement of the intake amount can use an anemometer. The temperature of an exhaust gas can be measured by using a thermocouple placed in the flue gas device or in the secondary combustor. A gas discharged during the progress of carbonization reaches the flue gas device through the flue gas passage and is heated again in the secondary combustor. The gas heated again is made colorless and odorless and discharged to the outside through a chimney of the secondary combustion device. Heat generated in the secondary combustor is used for secondary use through the heat exchanger and/or the boiler.

EXAMPLES

Charcoal making was conducted with the charcoal making furnace described in the first embodiment. The housing portion (first cage) of a charcoal making target in the charcoal making unit has such dimensions that a bottom surface is 1870 mm×1870 mm and a height is 1100 mm. A charcoal raw material of 3 $m^3$ was housed in the first cage. The carbonization time was six to eight hours. The progress of carbonization was observed by monitoring the temperature of an exhaust gas and the temperature of the secondary combustor. About 100 Kg of charcoal was obtained from about 400 Kg of the charcoal raw material. The exhaust gas temperature was initially room temperature and was about 120° C. to 150° C. during the progress of carbonization. The temperature in the secondary combustor during the progress of carbonization rose to about 800° C. Even at the same temperature of an exhaust gas, the temperature in the secondary combustor varies depending on components included in the exhaust gas. For example, during the progress of charcoal making, in a case where a large amount of an organic substance is included in the exhaust gas, the temperature in the secondary combustor rises to about 800° C. because of combustion of the organic substance in the secondary combustor. On the other hand, when charcoal making is finished and steam is mainly discharged, the temperature in the secondary combustor is about 500° C.

In general, the amount of a discharged gas varies depending on the degree of progress of charcoal making. In this regard, in the charcoal making apparatus according to the present disclosure, charcoal making processes in the charcoal making furnaces are performed concurrently with staggered timings so that the degree of variations in the amount of a gas flowing into the flue gas device can be thereby reduced. Accordingly, stable electric power generation and hot water supply, for example, can be performed. In addition, among the plurality of charcoal making furnaces, only charcoal making furnaces in which charcoal making is finished can be separated from the flue gas passage. Accordingly, cooling and collection of charcoal can be performed quickly.

It should be understood that the embodiments disclosed here are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

A charcoal making apparatus according to the present invention is especially advantageously applicable as a charcoal making apparatus having fewer locational restrictions and capable of carbonizing various raw materials.

DESCRIPTION OF THE REFERENCE NUMERALS 1 charcoal making apparatus, 11 charcoal making furnace, 21 casing, 211, 212, 23, 27 lid, 22, 25, 534 furnace opening, 271, 272 intake cylinder, 28, 281, 282, 415, 519 hook, 31, 311, 312 charcoal making unit, 41, 411, 412, 413 inner unit, 42, 43, 414 cage, 51 base, 511, 512 furnace body, 515 tray, 52 heat-resistant panel, 61, 62, 63 flue gas pipe, 81 flue gas device.

The invention claimed is:

1. A charcoal making apparatus comprising:
a charcoal making furnace;
a flue gas device; and
a passage connecting the charcoal making furnace and the flue gas device to each other, wherein
the charcoal making furnace includes
a base, and
a charcoal making unit mounted on the base,
the charcoal making unit includes
an inner unit that includes
a first cage that houses a charcoal making target and is open at an upper surface and
a second cage that houses a kindling material and is located above the base and below the first cage, and
a casing that includes side walls and un upper wall and covers an upper surface and a side surface of the inner unit,
the side walls of the casing include a first furnace opening and a second furnace opening each of which is located at positions corresponding to the second cage,
the first furnace opening is openable and closable and allows inside and outside of the charcoal making unit to communicate with each other when it is open,
the second furnace opening that is openable and closable and allows inside and outside of the charcoal making unit to communicate with each other and communicate with the passage when it is open,
a boundary between the first cage and the second cage is at least partially made of a mesh,
the upper wall of the casing includes a lid that is openable and closable and inside and outside of the charcoal making unit to communicate with each other.

2. The charcoal making apparatus according to claim 1, wherein
the first cage and the second cage are integrated.

3. The charcoal making apparatus according to claim 1, wherein
the first cage and the second cage are separable from each other.

4. The charcoal making apparatus according to claim 1, wherein
in the inner unit, plurality of the first cages are stacked.

5. A method for making charcoal with the charcoal making apparatus according to claim 1, wherein the method includes;
a first step in which a charcoal making target is supplied to the first cage and a kindling material is placed in the second cage,
a second step in which the kindling material placed in the second cage is ignited through the first furnace opening,
a third step in which carbonization is caused to proceed with intaking air from the first furnace opening or from the opening of the upper wall of the casing and exhausting gas from the second furnace opening.

6. A charcoal making apparatus comprising:
a charcoal making furnace;
a flue gas device; and
a passage connecting the charcoal making furnace and the flue gas device to each other, wherein
the charcoal making furnace includes
a base, and
a charcoal making unit mounted on the base,
the charcoal making unit includes
a furnace body that includes
a first tray that houses a charcoal making target and is open at an upper surface and
a second tray located above the base and below the first tray and houses a kindling material, and
a lid that covers an upper surface of the furnace body,
the side walls of the second tray include a first furnace opening and a second furnace opening,
the first furnace opening is openable and closable and allows inside and outside of the charcoal making unit to communicate with each other when it is open,
the second furnace opening that is openable and closable and allows inside and outside of the charcoal making unit to communicate with each other and communicate with the passage when it is open,
a boundary between the first tray and the second tray is at least partially made of a mesh,
the lid includes an opening that is openable and closable and allows inside and outside of the charcoal making unit to communicate with each other.

7. The charcoal making apparatus according to claim 6, wherein
the first tray and the second tray are integrated.

8. The charcoal making apparatus according to claim 6, wherein
the first tray and the second tray are separable from each other.

9. The charcoal making apparatus according to claim 6, wherein
in the charcoal making unit, plurality of the first trays are stacked.

10. A method for making charcoal with the charcoal making apparatus according to claim 6, wherein the method includes;
- a first step in which a charcoal making target is supplied to the first tray and a kindling material is placed in the second tray,
- a second step in which the kindling material placed in the second tray is ignited through the first furnace opening,
- a third step in which carbonization is caused to proceed with intaking air from the first furnace opening or from an opening of the lid and exhausting gas from the second furnace opening.

\* \* \* \* \*